Aug. 24, 1943. F. W. CURTIS 2,327,404
MILLING MACHINE
Filed July 15, 1941 4 Sheets-Sheet 1
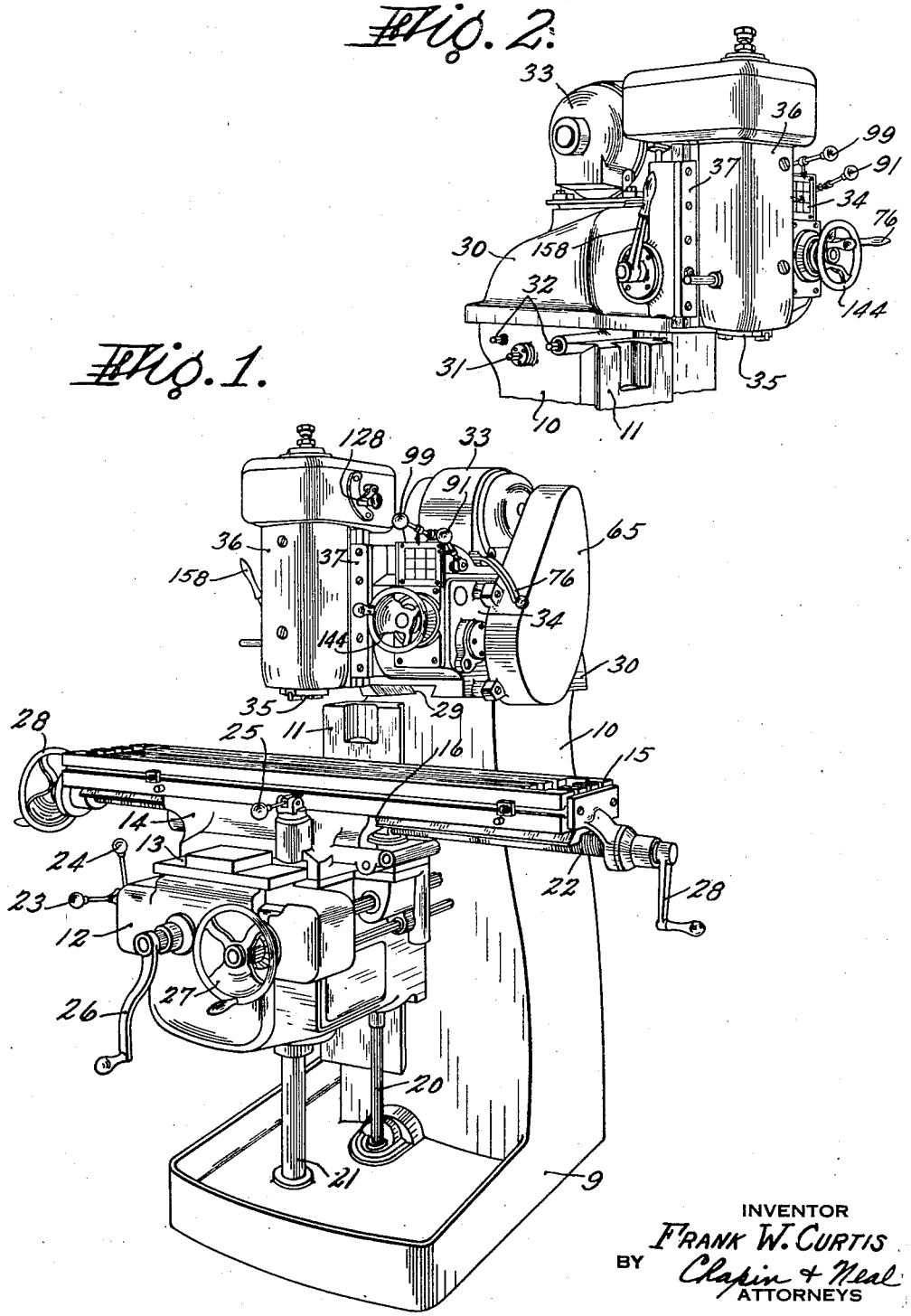
INVENTOR
FRANK W. CURTIS
BY Chapin + Neal
ATTORNEYS

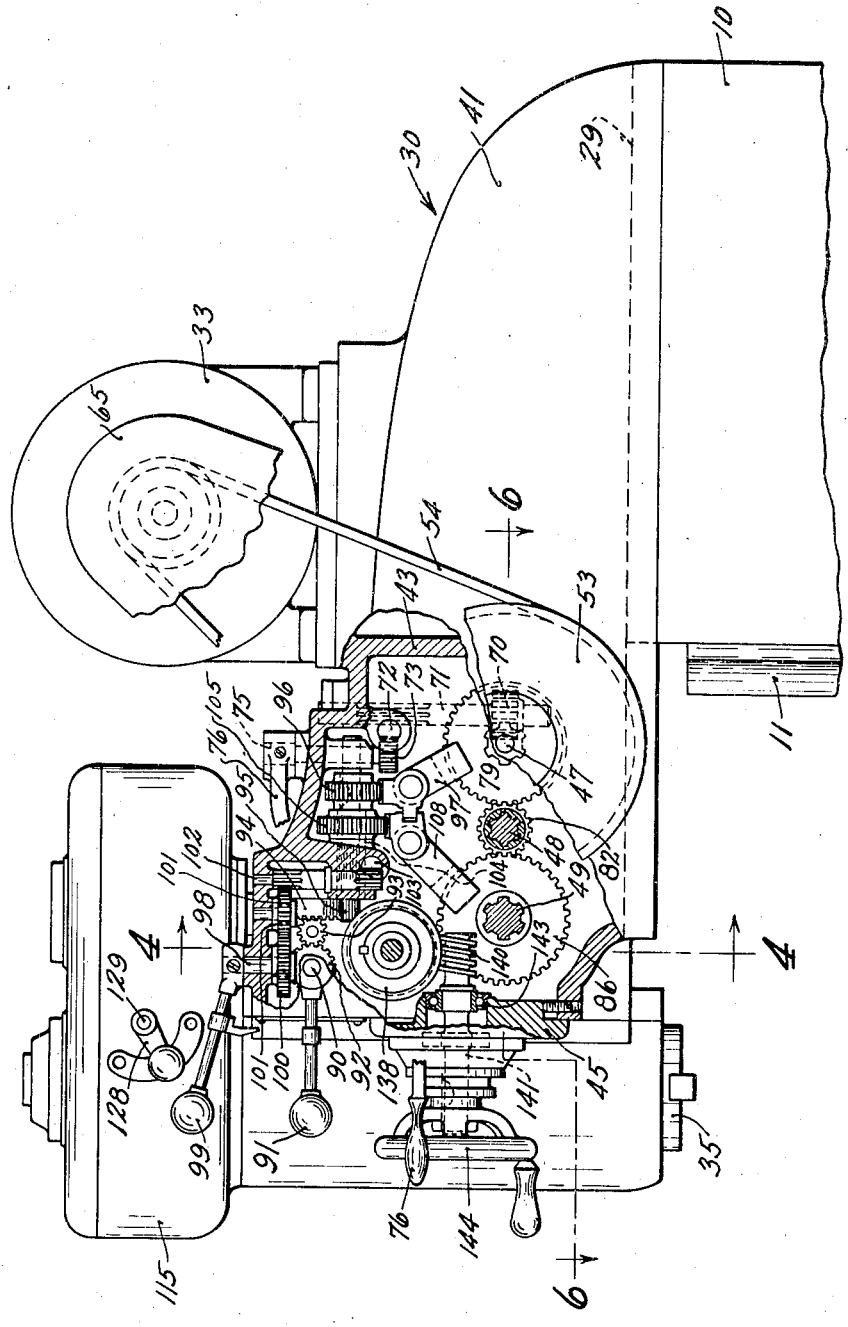

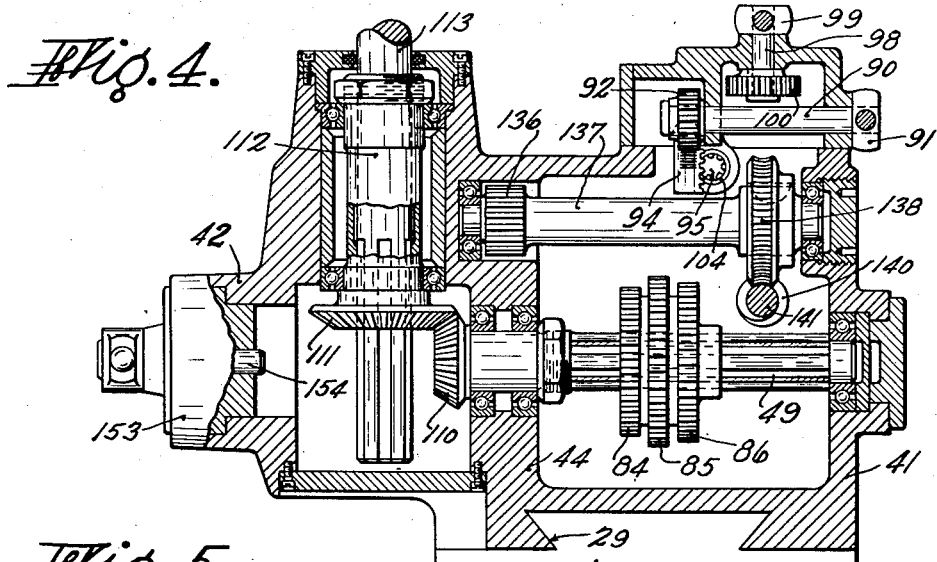
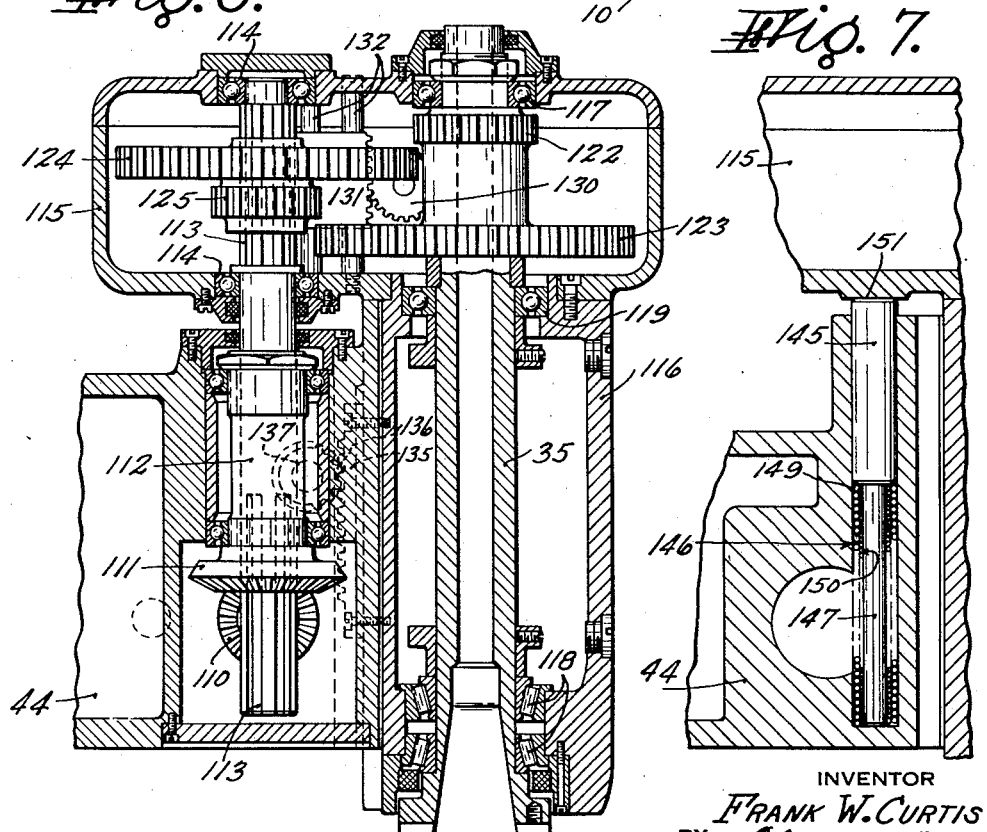

Patented Aug. 24, 1943

2,327,404

UNITED STATES PATENT OFFICE 2,327,404

MILLING MACHINE

Frank W. Curtis, Springfield, Mass., assignor to Van Norman Machine Tool Company, Springfield, Mass., a corporation of Massachusetts Application July 15, 1941, Serial No. 402,479

7 Claims. (Cl. 90—14)

This invention relates to milling machines and particularly to vertical spindle, ram type millers.

One object of the present invention is to provide an improved ram structure which because of its arrangement of control levers permits great facility of adjustment of the speed of the spindle and of its position relative to the work support. A further object is to provide a ram which though suitable for heavy duty cutting at various speeds is exceedingly compact. An additional object is to provide an improved counterbalance to aid in smooth adjustment of the spindle relative to the work. Another object is to provide an improved depth stop for limiting the amount which the spindle can be adjusted towards the work. An additional object is to provide a belt guard arranged to cooperate in a novel manner with a main clutch-brake unit to provide for braking of the spindle.

How I attain the foregoing and additional objects will be clear from a reading of the following specification taken in conjunction with the accompanying drawing in which:

Fig. 1 is a perspective view of a milling machine embodying my invention;

Fig. 2 is a perspective view of a portion of the structure of Fig. 1 but taken at a different angle to show additional features;

Fig. 3 is an enlarged side elevation of the ram but with certain parts broken away in the interest of clearness;

Fig. 4 is a vertical section substantially on line 4—4 of Fig. 3;

Fig. 5 is a vertical section through the spindle carrier;

Fig. 7 is a side elevation on line 7—7 of Fig. 6.

Figure 6:
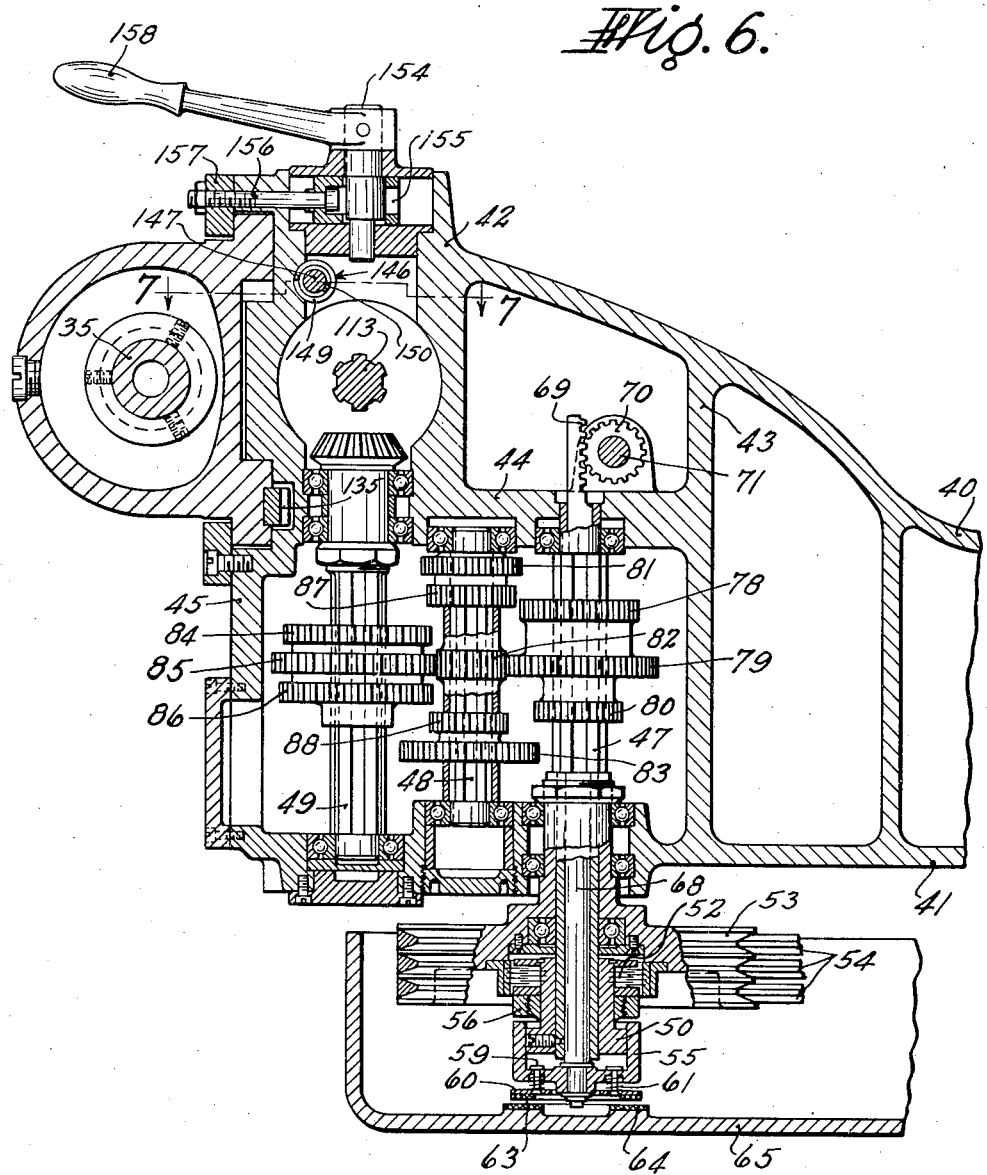
Fig. 6 is a horizontal section on line 6—6 of Fig. 3.

Referring to Figs. 1 and 2, the milling machine shown consists of a base 9 from which arises a column 10 on which is supported for vertical reciprocation on ways 11 a knee 12. Carried for reciprocation on the knee as on ways 13 is a saddle 14 which in turn supports a table 15 reciprocably mounted on ways 16 at right angles to ways 13. A main drive shaft 20 extending from the knee into the base is suitably coupled to a prime mover in the bottom of the column and transmits power to a transmission within the knee structure. This transmission may be arranged in any desired manner, one suitable form being that shown in my copending application Serial No. 322,973. Power thus delivered to the knee is, through suitable gears and clutches, connected to reciprocate the knee, saddle, and table by means of a knee screw contained within a telescoping casing 21, a saddle screw (not shown) and a table screw 22. Control of the power feed for the knee, saddle and table may be obtained by control levers 23, 24, and 25 respectively, while manual adjustment of these members may be accomplished by hand cranks 26, 27 and 28.

At the top, column 10 is provided with ways 29 on which is supported for reciprocation a ram 30. Suitable rack and pinion mechanism is carried by the column and ram for adjustment of the latter along ways 29, a shaft 31 protruding from the column and provided with a squared end for the reception of a crank for operation of the mechanism being indicated. Ram binders indicated generally at 32 are provided to secure the ram in its adjusted position.

The mechanism carried by the ram includes a prime mover 33, here shown as an electric motor, suitably coupled to a speed changing transmission indicated generally at 34, Figs. 1 and 2, and coupled to drive a spindle 35 supported for rotation in a spindle carrier 36. This last member is vertically reciprocable on ways 37 on the front of the ram and, as will be explained in detail, the spindle may be adjusted axially by adjusting the carrier on the ways 37, means to be described being provided to clamp the carrier in its adjusted position. In addition, the speed of rotation of the spindle 35 may be varied by suitably adjusting the transmission 34.

Referring now to Figs. 3, 4 and 6, the ram 30 is formed at the rear with parallel side walls 40 and 41. Near the forward end of the ram, wall 40 is displaced laterally as at 42 and a transverse web or partition 43 provided. Between the side walls a longitudinal web or partition 44 extends from web 43 to the front wall 45 of the ram. As is plain from Fig. 6, this construction results in the forward end of the ram having a main body portion formed by walls 41 and 45 and webs 43 and 44 and a laterally offset portion formed by walls 42 and 45 and webs 43 and 44.

The speed changer transmission is carried in the main body portion and consists of a primary shaft 47, an intermediate shaft 48, and a final drive shaft 49. Preferably these three shafts are all journaled transversely of the ram by suitable bearings carried by the partition 44 and side wall 41.

Shaft 47, which is a hollow splined shaft, is extended beyond the side wall 41 of the ram and has fixed for rotation with it one member 50 of a clutch-brake unit (Fig. 6). Member 50 carries friction plates 52 nesting with complementary friction plates carried by a pulley 53 which forms a second clutch member and which is mounted for rotation with respect to the side wall 41 and shaft 47. Pulley 53 is driven as by V belts 54 connected to the prime mover 33. Mounted concentrically with member 50 and fixed for rotation therewith is a collar 55. As is clear from the drawings, collar 55 may be shifted axially of member 50 in either direction from the neutral position shown and at its forward end is adapted to press against the usual nut 56 and force the plates 52 into engagement with the complementary plates on pulley 53 to thereby drive shaft 47. At its opposite end collar 55 is provided with studs 59 extending through holes in the transverse portion of the collar 55 and supporting a spider 60, springs 61 permitting the spider to shift towards the collar. Spider 60 has suitably secured thereto a clutch facing 63 adapted to be engaged with a friction member 64 provided on the inner surface of a belt guard 65 when the collar 55 is shifted axially away from pulley 53. Thus if collar 55 is shifted towards pulley 53 from the position shown, the motor will drive shaft 47 while if the collar is shifted away from pulley 53 from the position shown, facing 63 and friction member 64 will engage and lock shaft 47 against rotation. When the transmission is coupled to drive the spindle this last action will act as a brake for the spindle.

To shift collar 55, a rod 68 extending axially through shaft 47 is fixed at one end to collar 55 and provided at its opposite end with rack teeth 69. Rack teeth 69 are engaged by a gear 70 carried on a vertical shaft 71 which in turn is coupled in a well known manner through horizontal plunger 72 (Fig. 3) and gear 73 to a stub shaft 75 extending through the top plate of the ram. Above the ram, shaft 75 has attached thereto a handle 76 which extends forwardly of the ram for convenient manual operation of the clutch-brake unit.

Shaft 47 is splined as shown and carries a shiftable cluster gear consisting of gears 78, 79, and 80 adapted to be selectively engaged with gears 81, 82, and 83 of a cluster unit splined for rotation with intermediate shaft 48. Final drive shaft 49, which is journaled as shown in wall 41 and web 44, has splined to it a cluster gear unit comprising gears 84, 85, and 86 which are adapted to be selectively engaged with gears 87, 82, and 88 of the cluster gear unit on the intermediate shaft 48. Thus, final drive shaft 49 may be driven at any one of nine different speeds by suitable shifting of the cluster gear units on shafts 47 and 48.

For shifting cluster gears 78—80 and 84—86 a mechanism shown most clearly in Figs. 3 and 4 is provided. Fastened to one end of a shaft 90 journaled in the ram is a handle 91. At its opposite end shaft 90 has fixed thereto a gear 92 which through gear 93, engaged as shown with a vertical plunger 94, can shift this plunger axially. At its lower end plunger 94 carries rack teeth which engage complementary teeth on a short shaft 95 journaled horizontally in the ram. A spur gear 96 is keyed to this shaft and engages rack teeth on a shifter 97 engaging cluster gear unit 78—80. Thus the gear of cluster gear 78—80 can be selectively engaged with the gears on the intermediate shaft by rocking handle 91 about shaft 90 as an axis.

For shifting cluster gear 84—86, a short shaft 98 journaled vertically in the ram carries fixed at one end thereof a handle 99 and at its opposite end a gear 100 which through a gear 101 meshing with rack teeth on the upper end of a vertical shaft 102, may oscillate the latter. At its lower end, shaft 102 has rack teeth engaging complementary rack teeth in the forward end of a horizontal plunger 103 journaled as indicated in the ram. At its back end, plunger 103 through suitable rack teeth engages with a sleeve 104 mounted for rotation on shaft 95. Keyed to sleeve 104 is a gear 105 which meshes with a shifter 108 journaled in the ram as shown and engaging cluster gear 84—86. By swinging handle 99 in a horizontal plane, cluster gear 84—86 can be selectively engaged with the gears on intermediate shaft 48.

Referring to Figs. 4 to 6, the final drive shaft 49 of the transmission extends from the main body portion of the ram through the opening in web 44 into the offset portion and carries a bevel gear 110 meshing with a complementary bevel gear 111 having a long hub 112 and journaled vertically in the ram as indicated. Slidably received within the hub of gear 111 and splined to the gear is a vertical shaft 113 journaled parallel to spindle 35 in bearings 114 in a gear case 115 secured to the upper end of the body portion 116 of the spindle carrier. The spindle is journaled at its ends and at an intermediate point in suitable bearings 117, 118 and 119 carried in the gear case 115 and body portion 116. At its upper end and within the gear case, the spindle has fixed thereto a gear couplet comprising gears 122 and 123. Splined to the upper end of shaft 113 is a gear couplet consisting of gears 124 and 125 adapted to be selectively engaged with gears 122 and 123 respectively. As is clear, engagement of gears 122 and 124 will give a high speed drive to the spindle while engagement of gears 123 and 125 will give a low speed drive to the spindle. To provide for shifting couplet 124, 125 a suitable handle 128 (Fig. 3) is carried at one end of a shaft 129 journaled in the gear case. At its opposite end, shaft 129 carries a gear 130 arranged as shown to oscillate a shifter 131 engaging couplet 124, 125 and slidable on rods 132. Thus by shifting handle 128 to adjust couplet 124, 125 the nine speeds available to shaft 49 through adjustment of cluster gears 78, 80 and 84, 86 can be raised to eighteen for the spindle.

Referring to Figs. 3 to 6, to adjust the spindle carrier a rack 135 is secured to the body portion 116 adjacent ways 37, and is engaged by a spur gear 136 formed preferably integrally on one end of a shaft 137 journaled transversely of the main body portion of the ram between web 44 and wall 41. At its opposite end, shaft 137 has keyed thereto a worm wheel 138 which is in mesh with a worm 140 formed integrally with one end of a shaft 141 extending horizontally from the front wall 45 of the ram and journaled in bearings 143. At its forward end this shaft 141 has fixed thereto a handle 144 for manual operation of the worm.

To counterbalance the weight of the spindle carrier and also limit the amount to which it can be adjusted towards the table, the mechanism shown in Fig. 7 is provided. A plunger having a head 145 is slidably carried in a bore 146 formed in the offset portion of the ram parallel to the spindle, see Fig. 6. At its lower end the plunger is formed with a stem 147 over which is threaded a pair of nested helical compression springs 149 and 150. As will be apparent from the drawings, these springs tend to press the plunger out of the bore 146 and to force the head 145 against an abutment 151 formed on the bottom of the gear case 115. Thus the plunger acts as a counterbalance for the spindle carrier, the action being very smooth because of the use of nested springs which permit the use of "softer" springs than would be possible if a single spring were used. In addition, the length of the plunger is preferably such that when the carrier is moved downward the stem 147 will bottom in the bore 146 and limit the downward travel of the spindle carrier to the position shown in Figs. 5 and 7, which prevents damage to the gear case 115 or bearings 114 through contact with the top of the ram.

Referring to Figs. 4 and 6, the bore extending from the side wall 41 of the ram through web 44 and accommodating shaft 49 is extended out through the side wall 42 and has mounted therein a plug 153 forming a bearing member for a shaft 154 journaled in the plug and provided with an eccentric middle portion. The plug is provided with a transverse bore in which an eccentric strap 155 may slide. A bolt 156 is secured to the strap as shown and extends outwardly through the ram and engages the outer face of gib 157. By swinging a handle 158 secured to the protruding end of shaft 154 the gib will be pulled against the front wall of the ram to hold the spindle carrier in adjusted position. By having the spindle binder mounted coaxially with shaft 49, machining of the ram is considerably simplified since at the same time the ram is bored for shaft 49, provision is made for mounting the spindle carrier binder.

One important feature of the invention is the arrangement of the ram which results in the provision of the main body portion and the offset portion at the front of the ram. By mounting the transmission with its shafts arranged transversely of the ram and supporting the spindle carrier in the offset portion, the overall length of the ram can be cut down materially. In addition, the transmission shafts can have a relatively short length which results in a very sturdy construction.

Also as will be apparent from the foregoing description, the ram structure disclosed is not only compact and suited for heavy duty but is also exceedingly convenient for the operator because of the location adjacent the front of the ram of three speed controls 91, 99, 123, the clutch-brake control 76 and the manual spindle carrier adjusting handle 144.

I claim:

1. In a milling machine having a base, a column, a ram mounted on the column for reciprocation, said ram comprising a main body portion extending from the front to the back of the ram and an offset portion projecting laterally from the main body portion at the front of the ram, a prime mover carried by the ram, transmission mechanism mounted in the ram and driven by the prime mover and including a main clutch and a plurality of shiftable change gear units, a spindle carrier supported in said offset portion for reciprocation in a vertical plane laterally displaced from said main body portion, a spindle and a main driver supported in parallel relation in the spindle head for reciprocation therewith, and in said plane, the axis of said spindle lying beyond the end of the ram and the main driver extending into the offset portion, gearing connecting the main driver and transmission, shiftable change gears connecting the main driver and spindle, a manual control handle for vertical adjustment of the spindle carrier and mounted on the front of the ram in the main body portion, a plurality of manual control handles for shifting the clutch and the change gears of said transmission and mounted in the main body portion with their projecting ends extending beyond the ram and closely adjacent the first mentioned manual control handle, and a manual control for shifting the change gears in the spindle head and mounted in the side of the spindle carrier closely adjacent said first mentioned control handle.

2. In a milling machine having a base, a column, a ram mounted in the column for reciprocation, a spindle carrier and spindle extending beyond the end of the ram and supported on the ram for reciprocation in a direction transverse to that of the ram, a first variable speed transmission supported in the spindle carrier and connected to drive the spindle, a second variable speed transmission carried by the ram and connected to drive the first transmission, a prime mover carried on the ram, a main clutch coupling the prime mover and second transmission and a plurality of control levers for controlling the main clutch and for varying the speed of the second transmission and projecting beyond the ram at one side of the spindle and a control lever for the first transmission projecting from the spindle carrier at the aforementioned side of the spindle.

3. In a milling machine having a base, a column, and a ram reciprocable on the column, a spindle carrier vertically reciprocable on the ram, a spindle rotatable in the carrier, a splined shaft mounted in the carrier parallel to the spindle, change speed gearing between the shaft and the spindle, a drive shaft in the ram extending horizontally transverse to the ram, gearing coupling the drive shaft and the splined shaft, a prime mover on the ram, and change speed gearing connecting the prime mover and the drive shaft.

4. In a milling machine having a base, a column, and a ram reciprocable on the column, a spindle carrier vertically reciprocable on the ram, a spindle rotatable in the carrier, a splined shaft mounted in the carrier parallel to the spindle, change speed gearing between the shaft and the spindle, a drive shaft in the ram extending horizontally transverse to the ram, gearing coupling the drive shaft and the splined shaft, a prime mover on the ram, and change speed gearing connecting the prime mover and the drive shaft, a rack on the carrier, a rack-driving shaft parallel to the drive shaft and geared to the rack, an operating shaft extending to the front of the ram, and a worm connection between the operating shaft and the rack-driving shaft.

5. In a milling machine having a base, a column, a ram mounted on the column for reciprocation, a transverse partition extending between the side walls of the ram adjacent the front thereof, a longitudinal partition extending between the transverse partition and the front wall of the ram and having a transverse opening adjacent the front wall and axially aligned with a pair of openings in the side walls to thereby form a first and a second compartment in the front of the ram, a spindle carrier and spindle mounted on said ram for reciprocation in a plane passing through the first compartment and parallel to the longitudinal partition, a transmission journaled in said second compartment and including a final drive member extending from the second compartment into the first compartment and journaled in the opening in the partition and the opening in one of the side walls, driving connections between the spindle and drive member for rotation of the latter and a spindle carrier binder including a bearing member mounted in the opening in the other side wall and a handle journaled for rotation on a pivot extending axially through said opening.

6. In a milling machine having a base, a table supported for reciprocation on the base, a column, and a ram reciprocable on the column transversely of the table; a spindle carrier vertically reciprocable on the ram, a spindle rotatable in the carrier, power means carried by the ram for rotating the spindle, means to adjust the spindle carrier towards and from the table and a plunger journaled for reciprocation in the ram parallel to the spindle carrier and having an enlarged head at one end, an abutment on the spindle carrier overlying said head, a plurality of concentric nested helical compression springs carried by the ram and threaded on the plunger beneath the head and arranged to resiliently urge the plunger upwardly against the abutment on the spindle carrier during adjustment of the carrier towards and from the table.

7. In a milling machine having a table, a table supported for reciprocation on the base, a column, and a ram reciprocable on the column transversely of the table; a spindle carrier vertically reciprocable on the ram, a spindle rotatable in the carrier, power means carried by the ram for rotating the spindle, means to adjust the spindle carrier towards and from the table and a plunger journaled for reciprocation in the ram parallel to the spindle carrier and having an enlarged head at one end, an abutment on the spindle carrier overlying said head, a plurality of concentric nested helical compression springs carried by the ram and threaded on the plunger beneath the head and arranged to resiliently urge the plunger upwardly against the abutment on the spindle carrier during adjustment of the carrier to and from the table, and additional abutment means in the ram underlying the other end of the plunger and positioned to positively limit the downward movement of the plunger during adjustment of the spindle carrier towards the table.

FRANK W. CURTIS.